United States Patent Office 3,200,161
Patented Aug. 10, 1965

3,200,161
ISOMERIZATION OF DICYCLIC NAPHTHENES
CONTAINING 12 CARBON ATOMS
George Suld, Springfield, and Archibald P. Stuart, Media, Pa., assignors to Sun Oil Company, Philadelphia, Pa., a corporation of New Jersey
No Drawing. Filed July 31, 1962, Ser. No. 213,671
16 Claims. (Cl. 260—666)

This invention relates to the preparation of 2,6-dimethyldecahydronaphthalene by the low temperature isomerization of dicyclic naphthenes containing 12 carbon atoms. The invention also includes the conversion of 2,6-dimethyldecahydroaphthalene to 2,6-dimethylnaphthalene.

2,6-naphthalenedicarboxylic acid is a highly desirable article of commerce, particularly in that it can be used for making polyester type resins which have outstandingly good properties for certain applications. This acid is conveniently prepared by the catalytic oxidation of 2,6-dimethylnaphthalene.

A difficulty in the commercial preparation of 2,6-naphthalenedicarboxylic acid lies in finding a suitable source of 2,6-dimethylnaphthalene. This compound occurs in coal tar and cracked petroleum fractions of appropriate boiling range but only in low proportion since it is associated with the various other dimethylnaphthalene isomers, monocyclic aromatics, and non-aromatic hydrocarbons. A concentrate of the dimethylnaphthalene isomers can be obtained by solvent extraction of the fraction with an aromatic-selective solvent such as furfural, but the 2,6-isomer is still only a minor constituent of the concentrate. Attempts to isomerize the other isomers, particularly those in which both methyl groups are positioned on the same ring, to produce only the 2,6-isomer have not been successful.

A method has been recently disclosed (Serial No. 69,798 filed November 17, 1960, now abandoned) by which any dicyclic naphthene containing 12 carbon atoms can be isomerized to an equilibrium mixture of dimethyldecahydronaphthalene in which 2,6-dimethyldecahydronaphthlene occurs in relatively high proportion. The method comprises contacting the dicyclic naphthene with an $AlBr_3$-HBr catalyst at a temperature of 10–60° C. 2,6-dimethyldecahydronaphthalene can be separated from the resulting equilibrium mixture by cooling the mixture to about —20 to —40° C., for within this temperature range the 2,6-isomer selectively crystallizes, the other isomers remaining in the liquid phase. After separation of the 2,6-isomer, by, for example, filtration, the remaining isomers can be recycled back to the isomerization step where, in admixture with more dicyclic naphthene starting material, they are again isomerized to the equilibrium mixture.

In the above described process the yield of solid 2,6-dimethyldecahydronaphthalene is about 15% by weight of dicyclic naphthene starting material, that is, about 15% of the feed to the isomerization step can be recovered from the equilibrium mixture as solid 2,6-dimethyldecahydronaphthalene.

We have now discovered that dicyclic naphthenes containing 12 carbon atoms can be isomerized to a mixture of dimethyldecahydronaphthalene isomers from which mixture the 2,6-isomer precipitates in high yield almost immediately without any change in reaction conditions. That is, isomerization to 2,6-dimethyldecahydronaphthalene and precipitation of 2,6-dimethyldecahydronaphthalene occur almost simultaneously.

According to the present invention any dicyclic naphthene containing 12 carbon atoms is contacted with a catalyst at a temperature in the range of —10° to —60° C., preferably —20° to —50° C. Isomerization commences and after a short time interval, 2,6-dimethyldecahydronaphthalene begins to precipitate. Thereafter isomerization and precipitation occur simultaneously, Precipitation continues until over 50 weight per cent of the starting material has been recovered as solid 2,6-dimethyldecahydronaphthalene.

The invention is described in more detail as follows: The starting material is any $C_{12}$ dicyclic naphthene. Regardless of its precise structure, it can be isomerized to and precipitated as 2,6-dimethyldecahydronaphthalene by the method of the invention. The naphthene rings can be either condensed or non-condensed, and any alkyl substituent or substituents can be included that will result in the naphthene having 12 carbon atoms. The following are examples of suitable dicyclic naphthene starting materials: dimethyldecahydronaphthalenes (other than the 2,6-isomer), ethyl decahydronaphthalenes, trimethylhydrindanes, ethylmethylhydrindanes, propylhydrindanes, bicyclohexyl, dimethylbicyclopentyls, ethylbicyclopentyls, 1,2-bicyclopentylethane, cyclopentylmethylcyclopentylmethanes, etc. Means for obtaining such starting materials include separation from suitable petroleum fractions, hydrogenation of coal tar fractions, and dimerization of methylcyclopentane and/or cyclohexane.

The isomerization catalyst contains three components, hydrogen fluoride (HF), a promoter, and an initiator. The promoter can be either boron trifluoride ($BF_3$) or antimony pentafluoride ($SbF_5$), although $BF_3$ is preferred. The initiator can be any olefin, alcohol, ether, or alkyl halide containing not more than 5 carbon atoms. Examples of suitable initiators are propylene, ethylene, 2-pentanol, ethanol, diethylether, 1-chloropropane, dibromomethane, and the like. Propylene is a preferred initiator.

There is no requirement that the catalyst components be used in the liquid or vapor phase, but it is desirable to keep as many of the components as possible in the liquid phase in order to insure efficient contact of the catalyst system with the dicyclic naphthene starting material and consequent improvement in the isomerization rate. HF boils at 194° C. and hence will be in the liquid phase since the permissible isomerization temperatures of the invention are in the range —10 to —60° C. $BF_3$ boils at —101° C. and consequently is used as a gas, but it is desirable to maintain the reaction vessel under a $BF_3$ partial pressure of 50–200 p.s.i. in order to insure that some $BF_3$ is dissolved in the other liquid components. $SbF_5$ melts at 7.0° C. but is soluble in HF so that it will also be present in liquid phase. The initiators are either liquid at the permissable temperatures of —10° C. to —60° C. or are soluble in the dicyclic naphthene starting material; hence no problem arises in effecting efficient contact of the initiator and dicyclic naphthene.

The amount of each of the catalyst components can vary over fairly wide limits, for the amount present mainly determines the rate of isomerization rather than the fact of isomerization. It is believed that the catalyst components form a carbonium ion and that the isomerization reaction proceeds via a carbonium ion mechanism with the rate of isomerization being proportional to the number of carbonium ions present. To obtain optimum isomerization rates, the amount of initiator used should be 0.005 to 0.3, preferably 0.01 to 0.10, mol per mol of dicyclic naphthene starting material. The amount of HF and promoter can be as low as 1 mol of each per mol of initiator but the isomerization rate is maximized by using an excess of each. Use of excess HF and promoter shifts the equilibrium among the catalyst components to the formation of carbonium ions. Preferably the amount of HF is 25 to 300 mols per mol of initiator, and the amount of promoter is preferably 5–50 mols per mol of initiator. When $BF_3$ is used as the promoter, the most convenient means of insuring an excess is to maintain the reactor under a $BF_3$ partial pressure of 50–200 p.s.i. This technique also has another advantage as mentioned hereinbefore.

The catalyst can be contacted with the dicyclic naphthene in any desired manner. Most conveniently, the initiator is dissolved in the dicyclic naphthene, the solution is then charged to the reaction vessel and the remaining catalyst components then are added separately. Alternatively, the dicyclic naphthene can be charged to a reactor containing the catalyst components. As another alternative, the HF can be admixed with the dicyclic naphthene and the mixture contacted with the remainder of the catalyst components. Regardless of the technique used, it is desirable to agitate the reaction mass to insure efficient contact of all the ingredients with each other.

After contacting the dicyclic naphthene starting material with the catalyst at a temperature in the range of —10° C. to —60° C., preferably —20° C. to —50° C., two results take place. Initially, the dicyclic naphthene begins to isomerize to a mixture of dimethyldecahydronaphthalene isomers. No precipitation of the 2,6-isomer occurs. This isomerization without precipitation continues until a constant composition mixture containing about 30–35% 2,6-dimethyldecahydronaphthalene based on $C_{12}$ naphthene content is obtained, whereupon 2,6-dimethyldecahydronaphthalene does begin to precipitate. The time required to reach the constant composition mixture will vary with the amount of catalyst, the nature of the dicyclic naphthene starting material and the like, but it will generally be on the order of 5–60 minutes. Once the precipitation of 2,6-dimethyldecahydronaphthalene has begun, it continues until over 50% of the starting dicyclic naphthene has been precipitated as 2,6-dimethyldecahydronaphthalene. It is not necessary to remove the precipitate as it is formed in order to keep the reaction going. On the other hand, as the precipitate forms, the reaction mixture does become more viscous and in order to prevent the mixture from becoming unhandleable, one of several schemes are desirably employed. A diluent such as propane or n-pentane can be added to the reaction mixture; this will not cause any substantial change in either the isomerization rate or the amount of 2,6-dimethyldecahydronaphthalene recovered. Alternatively, a filter is employed to remove the precipitate as it forms while at the same time additional dicyclic naphthene starting material is charged to the reactor. In this alternative not only is the reaction mass maintained in a fluid easily handled condition, but a continuous operation is achieved.

The results of the present invention are unusual in several aspects. There are 15 position isomers of dimethyldecahydronaphthalene and to find that one selectively precipitates is itself surprising. But in addition to the position isomers, there are also the geometric and optical isomers of each position isomer. The total number of geometric isomers of dimethyldecahydronaphthalene is in excess of 50 is probably about 86. The possibility of optical isomers increases this number even further. To find that only 2,6-dimethyldecahydronaphthalene precipitates from such a mixture is indeed surprising. While it is believed that the precipitated 2,6-isomer consists of only one geometric isomer rather than a mixture of several geometric isomers, this is actually immaterial because upon dehydrogenation of the precipitate only 2,6-dimethylnaphthalene is obtained.

It is also surprising to find that 2,6-dimethyldecahydronaphthalene can be recovered in yields of over 50% and that this result is obtained in only one step. By way of comparison, it was mentioned hereinbefore that when a dicyclic naphthene containing 12 carbon atoms is isomerized at 10°–60° C. with an $AlBr_3$-HBr catalyst and then cooled to —20° C. to —30° C., only about 15% solid 2,6-dimethyldecahydronaphthalene is recovered and two steps are required to effect even this recovery.

Furthermore, it has been found that within the allowable temperature range of the present invention, the $AlBr_3$-HBr catalyst is inoperable. That is, $AlBr_3$-HBr cannot be used to achieve simultaneous isomerization and precipitation.

The reason for the substantial yield improvement achieved by the present invention is not known with certainty. It is not a matter of an equilibrium between the 2,6-dimethyldecahydronaphthalene precipitate and the remaining liquid phase because, as mentioned previously, the precipitate does not have to be removed as it is formed in order to obtain more precipitate. The most likely explanation is that the catalyst causes the dicyclic naphthene starting material to isomerize to an equilibrium mixture of dimethyldecahydronaphthalene in which the 2,6-dimethyldecahydronaphthalene content is higher than the solubility of 2,6-dimethyldecahydronaphthalene in the mixture. Because of the low solubility, equilibrium is never actually reached.

The 2,6-dimethyldecahydronaphthalene recovered according to the invention can be dehydrogenated to 2,6-dimethylnaphthalene. This step is readily carried out by passing 2,6-dimethyldecahydronaphthalene over a conventional dehydrogenation catalyst at a temperature in the range of 375° C. to 450° C., more preferably 400° C. to 425° C. A platinum catalyst is preferred for this purpose such as platinum distended on alumina or activated carbon. Typically, the conversion to 2,6-dimethylnaphthalene is on the order of 70–75%. The unconverted dimethyldecahydronaphthalene can be separated from the 2,6-dimethylnaphthalene by distillation and recycled to the dehydrogenation step.

The following examples illustrate the invention more specifically. In the examples all percentages are on a weight basis.

*Example I*

The starting material in this example was a mixture of position isomers of $C_{12}$ decahydronaphthalenes which analyzed as follows:

| | Percent |
|---|---|
| 2,6-dimethyldecahydronaphthalene | 11 |
| 2,7-dimethyldecahydronaphthalene | 11 |
| 1-ethyldecahydronaphthalene | 1 |
| 1,3-, 1,6-, and 1,7-dimethyldecahydronaphthalene | 38 |
| 1,4-, and 2,3-dimethyldecahydronaphthalene | 12 |
| 1,2-, and 1,8-dimethyldecahydronaphthalene | 6 |
| 2-ethyldecahydronaphthalene | 1 |
| Methyldecahydronaphthalenes | 20 |

25 gm. of this starting material (approximately 0.12 mole $C_{12}$ dicyclic naphthene) were added to a shaking type autoclave maintained at —30° C. Next 1.1 moles HF and 0.006 mole propylene were added thereto. Finally $BF_3$ was charged to the autoclave until the pressure in the autoclave was 75 p.s.i.g. The amount of $BF_3$ added was 0.07 mole. The reaction mixture was then shaken mechanically for 1 hour at —30° C. No crystals were present in either the organic layer or the catalyst phase. The organic layer was decanted, weighed and analyzed. It weighed 25 gm. and contained 35% 2,6-dimethyldecahydronaphthalene based on total $C_{12}$ naphthenes. The starting material contained about 14% 2,6-dimethyldecahydronaphthalene based on total $C_{12}$ naphthenes.

*Example II*

The starting material and procedure were the same as in Example I except that the reaction mixture was shaken for two hours instead of one hour. Now crystals were present in the organic layer. The organic layer containing the crystals was separated. It weighed 25 grams (liquid plus crystals) and analyzed 49% 2,6-dimethyldecahydronaphthalene based on total $C_{12}$ naphthenes. The crystals were then separated by filtration. The crystals weighed 4.5 grams and were found by gas chromatography and infrared analysis to be composed essentially of 2,6-dimethyldecahydronaphthalene. Thus about 22.5% of the $C_{12}$ naphthenes in the starting material was recovered as solid 2,6-dimethyldecahydronaphthalene. The precipitate recovered was dehydrogenated by passing it with hydrogen over a platinum on alumina reforming catalyst at 400° C. to 425 C. The resulting product was essentially pure 2,6-dimethylnaphthalene.

*Example III*

The starting material and procedure were the same as in Example I except that the reaction mixture was shaken for three hours instead of one hour. Again crystals were present in the organic layer. The organic layer containing the crystals weighed 25 grams and analyzed 59% 2,6-dimethyldecahydronaphthalene based on total $C_{12}$ naphthenes. The separated crystals weighed 7.4 grams and were found by analysis to be composed essentially of 2,6-dimethyldecahydronaphthalene. Thus about 37% of the $C_{12}$ naphthenes in the starting material was recovered as solid 2,6-dimethyldecahydronaphthalene.

*Example IV*

The starting material and procedure were the same as in Example I except that the mixture was shaken for six hours instead of one hour. Again crystals were present in the organic layer. The organic layer containing the crystals weighed 25 grams and analyzed 71% 2,6-dimethyldecahydronaphthalene based on total $C_{12}$ naphthenes. The separated crystals weighed 11.1 grams and were found by analysis to be composed essentially of 2,6-dimethyldecahydronaphthalenes. Thus about 55% of the $C_{12}$ naphthenes in the starting material was recovered as solid 2,6-dimethyldecahydronaphthalene. The crystals were dehydrogenated according to the procedure stated in Example I. The product of dehydrogenation was essentially pure 2,6-dimethylnaphthalene.

Example V illustrates the use of an isomerization temperature of −40° C.

*Example V*

The starting material and procedure were the same as in Example I except that the temperature was −40° C. instead of −30° C. and the reaction mixture was shaken for three hours instead of one hour. Crystals were present in the organic layer. The organic layer containing crystals weighed 25 grams and analyzed 51% 2,6-dimethyldecahydronaphthalene based on total $C_{12}$ naphthenes. The separated crystals weighed 4.9 grams and were found by analysis to be composed essentially of 2,6-dimethyldecahydronaphthalene. Thus 24.5% of the $C_{12}$ naphthenes in the starting material was recovered as solid 2,6-dimethyldecahydronaphthalene.

Examples VI and VII illustrates the use of a diluent in the reaction mixture.

*Example VI*

The starting material and procedure were the same as in Example II except that 5 grams of propane were also charged to the autoclave as a diluent. Crystals were present in the organic layer. The organic layer containing crystals (and also propane) weighed 30 grams and analyzed 55% 2,6-dimethyldecahydronaphthalene based on total $C_{12}$ naphthenes. The result in Example III corresponding to 55% was 59%. The separated crystals weighed 6.2 grams and where found by analysis to be composed essentially of 2,6-dimethyldecahydronaphthalene. Thus 31% of the $C_{12}$ naphthenes in the starting material was recovered as solid 2,6-dimethyldecahydronaphthalene. The corresponding result in Example III was 37%.

*Example VII*

The starting material and procedure were the same as in Example V except that 5 grams of propane were also charged to the autoclave as a diluent. Crystals were in the organic layer. The organic layer containing crystals (and also propane) weighed 30 grams and analyzed 56% 2,6-dimethyldecahydronaphthalene based on total $C_{12}$ naphthenes. The result in Example V corresponding to 56% was 51%. The separated crystals weighed 6.4 grams and were found by analysis to be composed essentially of 2,6-dimethyldecahydronaphthalene. Thus 32% of the $C_{12}$ naphthenes in the starting material was recovered as solid 2,6-dimethyldecahydronaphthalene. The corresponding result in Example V was 24.5%.

Examples VIII and IX illustrate the use of other dicyclic naphthene starting materials.

*Example VIII*

The starting material was 1-ethyl-3-methylhydrindane. Twenty grams of this starting material were charged to a shaking type autoclave maintained at −30° C. 0.5 mol HF and 0.004 mol propylene were then charged to the autoclave followed by 0.07 mol of $BF_3$. The reaction mixture when shaken for 3 hours, after which time crystals were present in the organic layer. The crystals were separated and found upon analysis to be composed essentially of 2,6-dimethyldecahydronaphthalene.

*Example IX*

The procedure was the same as in Example VIII except that the starting material was bicyclohexyl. Crystals were again present in the organic layer and were found, after separation, to be composed essentially of 2,6-dimethyldecahydronaphthalene.

When other dicyclic naphthenes and initiators of the type hereinbefore specified are used, or when $SbF_5$ is used as the promoter substantially analogous results are obtained.

We claim:

1. Method of preparing 2,6-dimethyldecahydronaphthalene comprising subjecting a dicyclic naphthene containing 12 carbon atoms, other than 2,6-dimethyldecahydronaphthalene, to a temperature in the range of −10° C. to −60° C. in the presence of a catalyst, said catalyst comprising HF, a promoter selected from the group consisting of $BF_3$ and $SbF_5$, and an initiator containing not more than 5 carbon atoms selected from the group consisting of olefins, alcohols, ethers, and alkyl halides, whereby isomerization occurs, continuing said isomerization beyond a time at which 2,6-dimethyldecahydroaphthalene precipitates from the reaction mixture, and separating said 2,6-dimethyldecahydronaphthalene precipitate from the reaction mixture.

2. Method of claim 1 in which the promoter is $BF_3$.

3. Method of claim 1 in which the initiator is propylene.

4. Method of claim 1 in which the temperature is in the range of −20° C. to −50° C.

5. Method of claim 1 in which the dicyclic naphthene is a mixture of dimethyldecahydronaphthalene isomers.

6. Method of claim 1 in which the dicyclic naphthene is 1-ethyl-3-methyl hydrindane.

7. Method of claim 1 in which the dicyclic naphthene is bicyclohexyl.

8. Method of preparing 2,6-dimethyldecahydronaphthalene comprising subjecting a dicyclic naphthene containing 12 carbon atoms, other than 2,6-dimethyldecahydronaphthalene, to a temperature in the range of −10° C. to −60° C. in the presence of a catalyst, said catalyst comprising HF, a promoter selected from the group consisting of $BF_3$ and $SbF_5$, and an initiator containing not more than 5 carbon atoms selected from the group consisting of olefins, alcohols, ethers, and alkyl halides, the amount of catalyst components being as follows: initiator, 0.005 to 0.3 mol per mol of dicyclic naphthene; promoter, at least 1 mol per mol of initiator; HF, at least 1 mol per mol of initiator, whereby isomerization occurs, continuing said isomerization beyond a time at which 2,6-dimethyldecahydronaphthalene precipitates from the reaction mixture, and separating said 2,6-dimethyldecahydronaphthalene precipitate from the reaction mixture.

9. Method of claim 8 in which the amount of initiator is 0.01 to 0.1 mol per mol of dicyclic naphthene, the amount of promoter is 5 to 50 mols per mol of initiator, and the amount of HF is 25 to 300 mols per mol of initiator.

10. Method of claim 8 in which the initiator is propylene.

11. Method of claim 8 in which the temperature is in the range of −20° C. to −50° C.

12. Method of claim 8 in which the promoter is $BF_3$ and in which said $BF_3$ is present in an amount sufficient to maintain a partial pressure of 50–200 p.s.i.

13. Method of claim 8 in which the dicyclic naphthene is a mixture of dimethyldecahydronaphthalene isomers.

14. Method of claim 8 in which the dicyclic naphthene is 1-ethyl-3-methyl hydrindane.

15. Method of claim 8 in which the dicyclic naphthene is bicyclohexyl.

16. Method of preparing 2,6-dimethylnaphthalene comprising subjecting a dicyclic naphthene containing 12 carbon atoms, other than 2,6-dimethydecahydronaphthalene, to a temperature in the range of −10° C. to −60° C. in the presence of a catalyst, said catalyst comprising HF, a promoter selected from the group consisting of $BF_3$ and $SbF_5$, and an initiator containing not more than 5 carbon atoms selected from the group consisting of olefins, alcohols, ethers, and alkyl halides, the amount of the catalyst components being as follows: initiator, 0.005 to 0.3 mol per mol of dicyclic naphthene; promoter, at least 1 mol per mol of initiator; HF at least 1 mol per mol of initiator, whereby isomerization occurs, continuing said isomerization beyond a time at which 2,6-dimethyldecahydronaphthalene precipitates from the reaction mixture, separating said 2,6-dimethyldecahydronaphthalene precipitate from the reaction mixture, and subjecting said separated 2,6-dimethyldecahydronaphthalene precipitate to dehydrogenating conditions in the presence of a dehydrogenating catalyst to form 2,6-dimethylnaphthalene.

References Cited by the Examiner
UNITED STATES PATENTS 2,723,947 11/55 Oblad et al. _____ 260—666
2,734,092 2/56 Schneider et al. _____ 260—666

JOSEPH R. LIBERMAN, *Primary Examiner.*

ALPHONSO D. SULLIVAN, *Examiner.*